May 12, 1931.  A. DE POLO  1,805,359
PROPELLER
Filed July 20, 1929   2 Sheets-Sheet 1
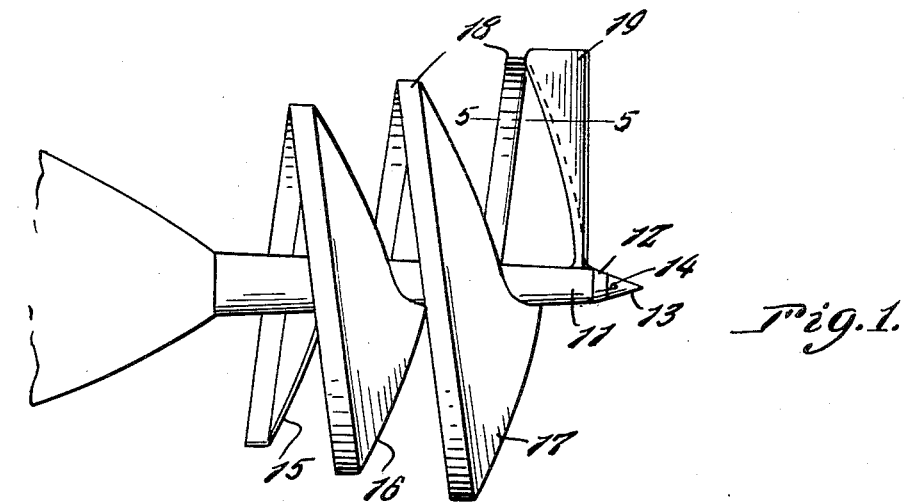
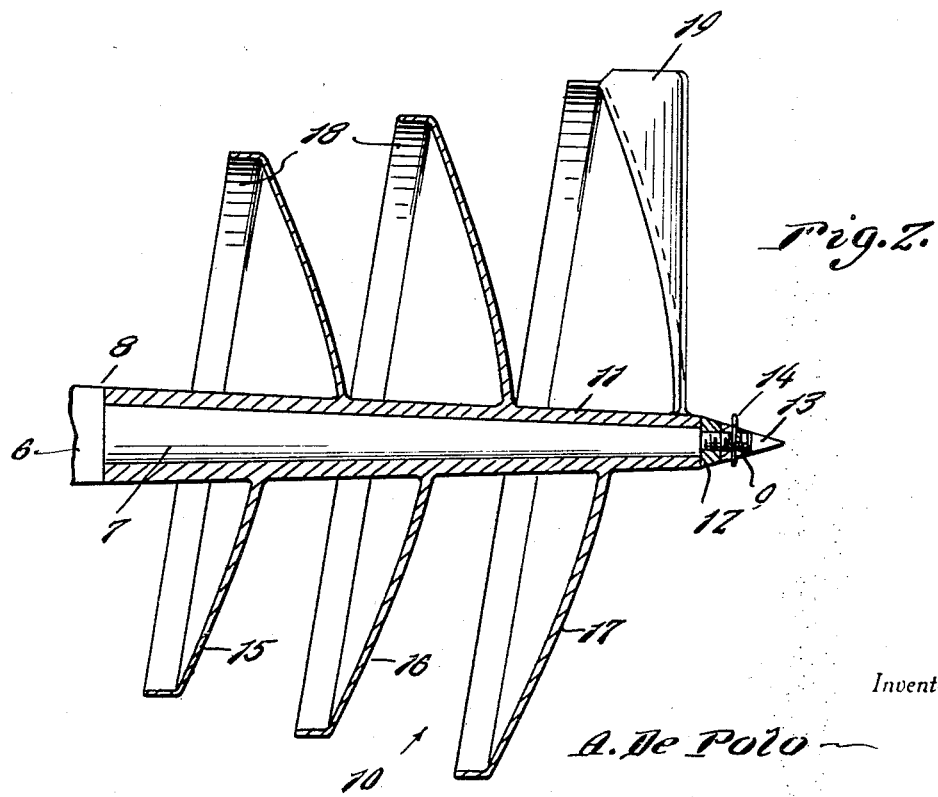
Inventor
A. De Polo
By Clarence A. O'Brien
Attorney May 12, 1931.  A. DE POLO  1,805,359
PROPELLER
Filed July 20, 1929  2 Sheets-Sheet 2
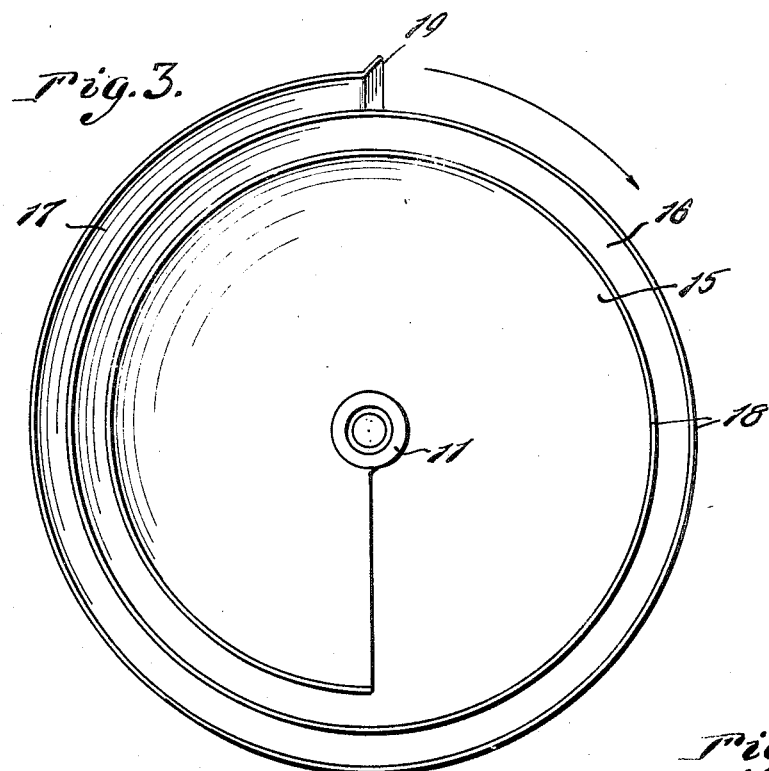
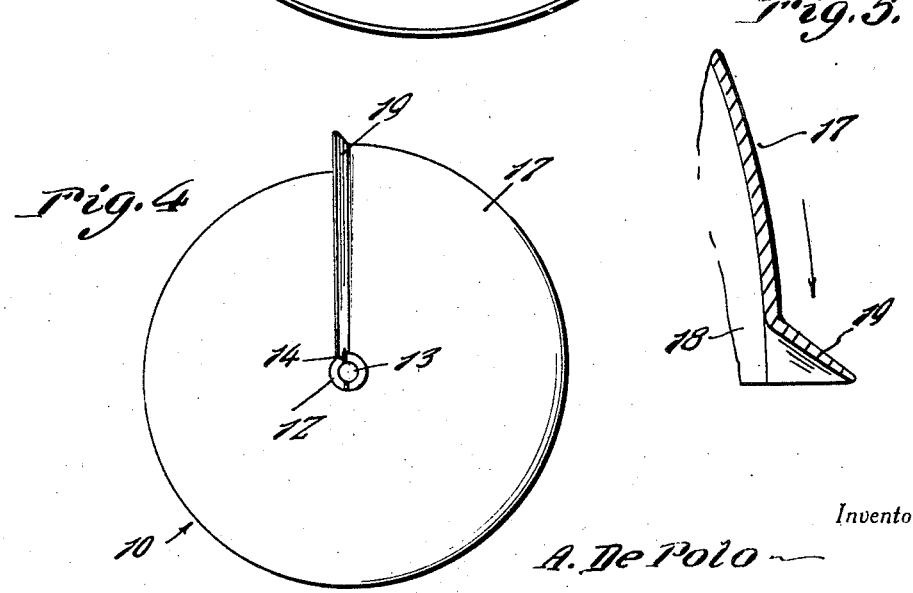
Inventor
A. De Polo
By Clarence A. O'Brien
Attorney Patented May 12, 1931

1,805,359

UNITED STATES PATENT OFFICE

ALFRED DE POLO, OF CONNELLSVILLE, PENNSYLVANIA

PROPELLER

Application filed July 20, 1929. Serial No. 379,852.

This invention relates to an improved propeller adapted for general use in arts and industry and especially useful in conjunction with both air and water machines and crafts.

The principal novelty is predicated upon a propeller of the screw type which is of spiral construction and composed of convolutions and sectors of helical design receding in appropriate proportion from the axis of rotation, and advancing in diameter from small to large in a direction outwardly from the source of power.

A feature of construction is embodied in the incorporation in the structure of a tapered hub mounted for rotation on a correspondingly tapered propulsion shaft, said hubs carrying integral spiral sectors of cupped cross sectional configuration, having marginal flanges or confining rims for conservation and proper development of a steady and incessant power whether used for water or air purposes.

My principal purpose is to generally improve upon propellers of this class by providing one which is distinct in configuration and design, and susceptible of fulfilling the requirements of this class in a more dependable and satisfactory manner.

In the drawings:
Figure 1 is a side elevational view of a propeller made in accordance with the present invention.

Fig. 2 is a longitudinal sectional view through the same.
Fig. 3 is an end elevation observing the structure in a direction from left to right in Fig. 1.

Fig. 4 is an end view observing the structure in a direction from right to left in Fig. 1.
Fig. 5 is a fragmentary sectional view, the section being on the plane of the line 5—5 of Fig. 1.

The structure may well be seen by referring to Fig. 2, wherein it will be observed that the reference character 6 designates the power or propeller shaft, having a reduced tapered end portion 7 defining a shoulder as at 8.

This terminates in a reduced screw threaded extremity 9. The propeller is generally designated by the reference character 10 and is of the spiral bladed or screwed type. It is formed from a single body of metal and includes a centralized hub portion 11 which is properly keyed on the reduced end portion 7 of the propeller shaft. This tapers in longitudinal alinement as well as decreases gradually in thickness from the shoulder 8 toward the screw threaded extremity 9.

On this extremity 9 is a retaining nut 12, a pointed cap-nut 13, and a safety cotter key 14 for holding the cap-nut in place. Although the sections or sectors of the propeller may be multiplied, I have shown three distinct sectors designated by the reference characters 15, 16 and 17 respectively. These are in the nature of lateral wings or blades, and gradually increase in diameter from the inner toward the outer end of the propeller shaft.

The web or body portion of the respective blades are of tapered cross sectional configuration and of curvate design. In other words, they taper inwardly from the marginal edges toward the hubs; that is, increase in thickness at the juncture with the hub. Thus these sectors are of cupped design and are provided with marginal flanges or rims 18.

This design conserves the power and insures concentration and incessant propulsion action. The terminal end of the sector 17 is provided with a lateral fin 19 and it will be observed that this extends from the hub toward and to the rim flange 18. In this connection, attention is invited to Fig. 5, wherein it will be observed that the fin is of tapered cross sectional configuration, and graduated in width from the hub toward the periphery. Moreover, it is disposed diagonally or at an approximate acute angle with respect to the axis of the hub 11.

An explanation of the theory and action of a propeller of this type in air or water is thought to be unnecessary. Experimentation has shown, that it decidedly increases and concentrates the power and is quite an effective improvement in the art to which the invention relates. It is thought that these features and advantages will be quite clear to persons skilled in the act to which the invention pertains. Therefore, a more lengthy description is believed to be unnecessary.

Minor changes in shape, size, and materials, and re-arrangement of features, coming within the field of invention claimed, may be resorted to in actual practice if desired.

Having thus described my invention, what I claim as new is:—

1. As a new product of manufacture, a propeller of the class described comprising a centralized hub tapered in diameter and thickness from the inner toward the outer end, and a plurality of integral sectors composed of spiral convolutions, advancing in diameter and receding in helical form from the inner toward said outer ends, the sectors being of general cupped or curvate configuration in cross section, and formed with peripheral flanges constituting power concentrating and confining rims, the outermost convolutions terminating in fins, said fins being disposed at approximate acute angles with respect to the longitudinal axis of the hub, and being graduated from the hub toward the periphery of said sector.

2. A propeller comprising a tapered power shaft, a correspondingly tapered sleeve mounted on the shaft for rotation therewith, a plurality of spiral sectors exteriorly connected with the sleeve and of helical design to provide a continuous grooved blade, said sector being respectively cupped on the side facing the inner or thicker end of the tapered hub and increasing in diameter in a direction outwardly from the said thicker end of the hub.

In testimony whereof I affix my signature.

ALFRED DE POLO.